United States Patent
Tsukamoto et al.

(10) Patent No.: US 10,297,854 B2
(45) Date of Patent: May 21, 2019

(54) FUEL CELL STACK

(71) Applicant: HONDA MOTOR CO., LTD., Tokyo (JP)

(72) Inventors: Keiji Tsukamoto, Wako (JP); Hiroki Homma, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 391 days.

(21) Appl. No.: 14/689,311

(22) Filed: Apr. 17, 2015

(65) Prior Publication Data

US 2015/0311559 A1 Oct. 29, 2015

(30) Foreign Application Priority Data

Apr. 23, 2014 (JP) ................................ 2014-088783

(51) Int. Cl.
*H01M 8/24* (2016.01)
*H01M 8/248* (2016.01)
(Continued)

(52) U.S. Cl.
CPC ......... *H01M 8/248* (2013.01); *H01M 8/0258* (2013.01); *H01M 8/0267* (2013.01); *H01M 8/0276* (2013.01); *H01M 8/04201* (2013.01); *H01M 8/1246* (2013.01); *H01M 8/2425* (2013.01); *H01M 8/2457* (2016.02);
(Continued)

(58) Field of Classification Search
CPC .. H01M 8/248; H01M 8/2425; H01M 8/0276; H01M 8/0267; H01M 8/2457; H01M 8/2483; H01M 8/0258; H01M 8/1246; H01M 8/04201; H01M 2300/0071; H01M 2008/1293
See application file for complete search history.

(56) References Cited

U.S. PATENT DOCUMENTS 6,042,955 A 3/2000 Okamoto
8,940,451 B2 1/2015 Fleck et al.
(Continued)

FOREIGN PATENT DOCUMENTS

CA 2658699 9/2009
DE 102008049712 4/2010
(Continued)

OTHER PUBLICATIONS

German Office Action with English Translation dated Feb. 23, 2016, 10 pages.
(Continued)

*Primary Examiner* — Philip A. Stuckey
(74) *Attorney, Agent, or Firm* — Rankin, Hill & Clark LLP

(57) ABSTRACT

A fuel cell of a fuel cell stack includes a power generation reaction area, a marginal area around the power generation reaction area, and a first reactant gas flow area and a second reactant gas flow area. The first reactant gas flow area and the second reactant gas flow area are provided outside the power generation reaction area and inside the marginal area. The fuel cell stack includes a first load applying unit configured to apply a first load to the marginal area in the stacking direction and a second load applying area configured to apply a second load to the power generation reaction area in the stacking direction.

6 Claims, 9 Drawing Sheets

(51) Int. Cl.
    *H01M 8/2457* (2016.01)
    *H01M 8/2483* (2016.01)
    *H01M 8/0267* (2016.01)
    *H01M 8/0276* (2016.01)
    *H01M 8/2425* (2016.01)
    *H01M 8/0258* (2016.01)
    *H01M 8/04082* (2016.01)
    *H01M 8/1246* (2016.01)
    *H01M 8/124* (2016.01)

(52) U.S. Cl.
    CPC .. *H01M 8/2483* (2016.02); *H01M 2008/1293* (2013.01); *H01M 2300/0071* (2013.01)

(56) References Cited

U.S. PATENT DOCUMENTS

| | | | |
|---|---|---|---|
| 2006/0166053 A1* | 7/2006 | Badding | H01M 8/0271 429/429 |
| 2009/0114531 A1 | 5/2009 | Rasten et al. | |
| 2010/0209820 A1 | 8/2010 | Akbay et al. | |
| 2011/0143251 A1 | 6/2011 | Morimoto et al. | |
| 2014/0141351 A1* | 5/2014 | Shinohara | H01M 8/12 429/457 |

FOREIGN PATENT DOCUMENTS

| | | |
|---|---|---|
| JP | 08-236126 | 9/1996 |
| JP | 09-326259 | 12/1997 |
| JP | 10-172594 | 6/1998 |
| JP | 2007-005169 | 1/2007 |
| JP | 2009-500525 | 1/2009 |
| JP | 2014-049383 | 3/2014 |
| WO | 2011/030769 | 3/2011 |
| WO | 2012/081322 | 6/2012 |
| WO | 2013/008655 | 1/2013 |

OTHER PUBLICATIONS

German Search Report with English Translation dated Feb. 22, 2016, 17 pages.
U.K. Office Action with Search Report dated Mar. 11, 2016, 7 pages.
Japanese Office Action dated Aug. 1, 2017, English translation included, 8 pages.

* cited by examiner

FUEL CELL STACK

CROSS-REFERENCE TO RELATED APPLICATION

This application is based upon and claims the benefit of priority from Japanese Patent Application No. 2014-088783 filed on Apr. 23, 2014, the contents of which are incorporated herein by reference.

BACKGROUND OF THE INVENTION

Field of the Invention

The present invention relates to a fuel cell stack formed by stacking a plurality of fuel cells each having an electrolyte electrode assembly. The electrolyte electrode assembly includes an anode, a cathode, and an electrolyte interposed between the anode and the cathode.

Description of the Related Art

In general, a solid oxide fuel cell (SOFC) employs a solid electrolyte of ion-conductive oxide such as stabilized zirconia. The electrolyte is interposed between an anode and a cathode to form an electrolyte electrode assembly, for example, a membrane electrode assembly (MEA). The electrolyte electrode assembly is interposed between separators (bipolar plates). In use, generally, predetermined numbers of the electrolyte electrode assemblies and the separators are stacked together to form a fuel cell stack.

In the fuel cell stack, in order to obtain the output voltage efficiently, the fuel cells need to be stacked together in a desired pressurized state. Further, in order to prevent leakage of a reactant gases such as a fuel gas and air as much as possible, it is required to apply pressure to the fuel cell stack in the stacking direction to seal reactant gas manifolds reliably.

To this end, an electrochemical cell stack disclosed in Japanese Laid-Open Patent Publication No. 2009-500525 (PCT) (hereinafter referred to as conventional technique 1) is known. As shown in FIG. 8, this electrochemical cell stack includes an electrochemical cell (proton exchange membrane (PEM) cell) stack $1a$ interposed between a first electrically conductive end plate $2a$ and a second electrically conductive end plate $3a$.

An end plate $4a$ is provided outside the second electrically conductive end plate $3a$, and the end plate $4a$ and the first electrically conductive end plates $2a$ are connected by a plurality of walls $5a$. An electrically insulating elastic pad $6a$ made of silicone or elastic polymer material is interposed between the second electrically conductive end plate $3a$ and the end plate $4a$. According to the disclosure, in operation, the electrically insulating elastic pad $6a$ can compensate heat expansion or heat contraction of the electrochemical cell stack $1a$.

Further, in a flat plate type solid electrolyte fuel cell disclosed in Japanese Laid-Open Patent Publication No. 10-172594 (hereinafter referred to as the conventional technique 2), a separator $1b$ as shown in FIG. 9 is provided, and a plurality of unit cells (not shown) and separators $1b$ are stacked alternately. Each of the unit cells includes a solid electrolyte layer and an air electrode and a fuel electrode provided on both surfaces of the solid electrolyte layer. A gas supply hole $2b$ and a gas discharge hole $3b$ are formed at a pair of diagonal positions of the separator $1b$, and a plurality of gas flow grooves $4b$ are formed at the central part of the separator $1b$.

A gas throttle section $5b$ and blocks $6b$ are provided between the gas supply hole $2b$ and the inlet of the gas flow grooves $4b$. According to the disclosure, in the structure, the pressure loss of the gas discharged from the gas supply hole $2b$ is increased, and it becomes possible to distribute the gas uniformly.

SUMMARY OF THE INVENTION

In the above conventional technique 1, the electrically insulating elastic pad $6a$ made of silicone or elastic polymer material is used. However, in the SOFC operated at high temperature in comparison with the PEM cell, the above electrically insulating elastic pad $6a$ cannot be used.

Further, in the above conventional technique 2, it is required to achieve both of good sealing performance at the gas supply hole $2b$ and the gas discharge hole $3b$ and good current collection performance of the sandwiching section sandwiching the electrode section (area covered by the gas flow grooves $4b$). In this regard, if a load applied to the fuel cell is configured to reliably achieve the sufficient gas sealing performance, the electrode section may be damaged undesirably. If a load applied to the fuel cell is configured to reliably achieve the sufficient current collection performance, the gas sealing performance is degraded.

Further, in the conventional technique 1 and the conventional technique 2 described above, in a high temperature area having 500° C. or more as the operating temperature of the SOFC, it is difficult to apply pressures to the gas sealing area and the current collection area using optimum loads respectively for a long period of time. Therefore, it is impossible to suppress damages of the fuel cells while reliably achieving the good sealing performance and good current collection performance.

The present invention has been made to solve the problems of this type, and an object of the present invention is to provide a fuel cell stack which makes it possible to suppress damages of fuel cells as much as possible, and achieve improvement in the gas sealing performance and current collecting performance.

The present invention relates to a fuel cell stack formed by stacking a plurality of fuel cells each having an electrolyte electrode assembly. The electrolyte electrode assembly includes an anode, a cathode, and an electrolyte interposed between the anode and the cathode.

The fuel cell includes a power generation reaction area having a fuel gas channel configured to supply a fuel gas along an electrode surface of the anode and an oxygen-containing gas channel configured to supply an oxygen-containing gas along an electrode surface of the cathode formed separately on front and back sides of the power generation reaction area. Further, the fuel cell includes a frame shaped marginal area around the power generation reaction area and a first reactant gas flow area and a second reactant gas flow area.

A fuel gas passage and an oxygen-containing gas passage are formed in each of the first reactant gas flow area and the second reactant gas flow area. The fuel gas passage is configured to allow the fuel gas to flow in the stacking direction of the fuel cells, and is connected to the fuel gas channel. The oxygen-containing gas passage is configured to allow the oxygen-containing gas to flow in the stacking direction, and is connected to the oxygen-containing gas channel.

The first reactant gas flow area is provided outside one end of the power generation reaction area and inside the marginal area and the second reactant gas flow area is provided outside another end of the power generation reaction area and inside the marginal area.

The first reactant gas flow area has one of a fuel gas supply passage and a fuel gas discharge passage as the fuel gas passage and one of an oxygen-containing gas supply passage and an oxygen-containing gas discharge passage as the oxygen-containing gas passage. The second reactant gas flow area has another of the fuel gas supply passage and the fuel gas discharge passage and another of the oxygen-containing gas supply passage and the oxygen-containing gas discharge passage.

The fuel cell stack has a first load applying unit configured to apply a first load to the marginal area in the stacking direction and a second load applying unit configured to apply a second load to the power generation reaction area in the stacking direction.

In the present invention, the first load applying unit for applying the first load to the marginal area in the stacking direction of the fuel cells and the second load applying unit for applying the second load to the power generation reaction area in the stacking direction are provided. In the structure, it becomes possible to apply the first load to the marginal area to suppress leakage of the reactant gases as much as possible, and improve the gas sealing performance. Moreover, it becomes possible to apply the second load to the power generation reaction area to connect the current collection areas together further tightly, and improve the current collection performance. Therefore, it is possible to suppress damages of the fuel cells as much as possible while suitably maintaining the desired gas sealing performance and current collection performance.

Further, it becomes possible to effectively suppress leakage of the reactant gases flowing through the first reactant gas flow area and the second reactant gas flow area to the outside of the marginal area. Moreover, supply of the reactant gases to the power generation reaction area and discharge of the reactant gases from the power generation reaction area are facilitated. Accordingly, both of good gas sealing performance and good current collection performance are achieved further suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
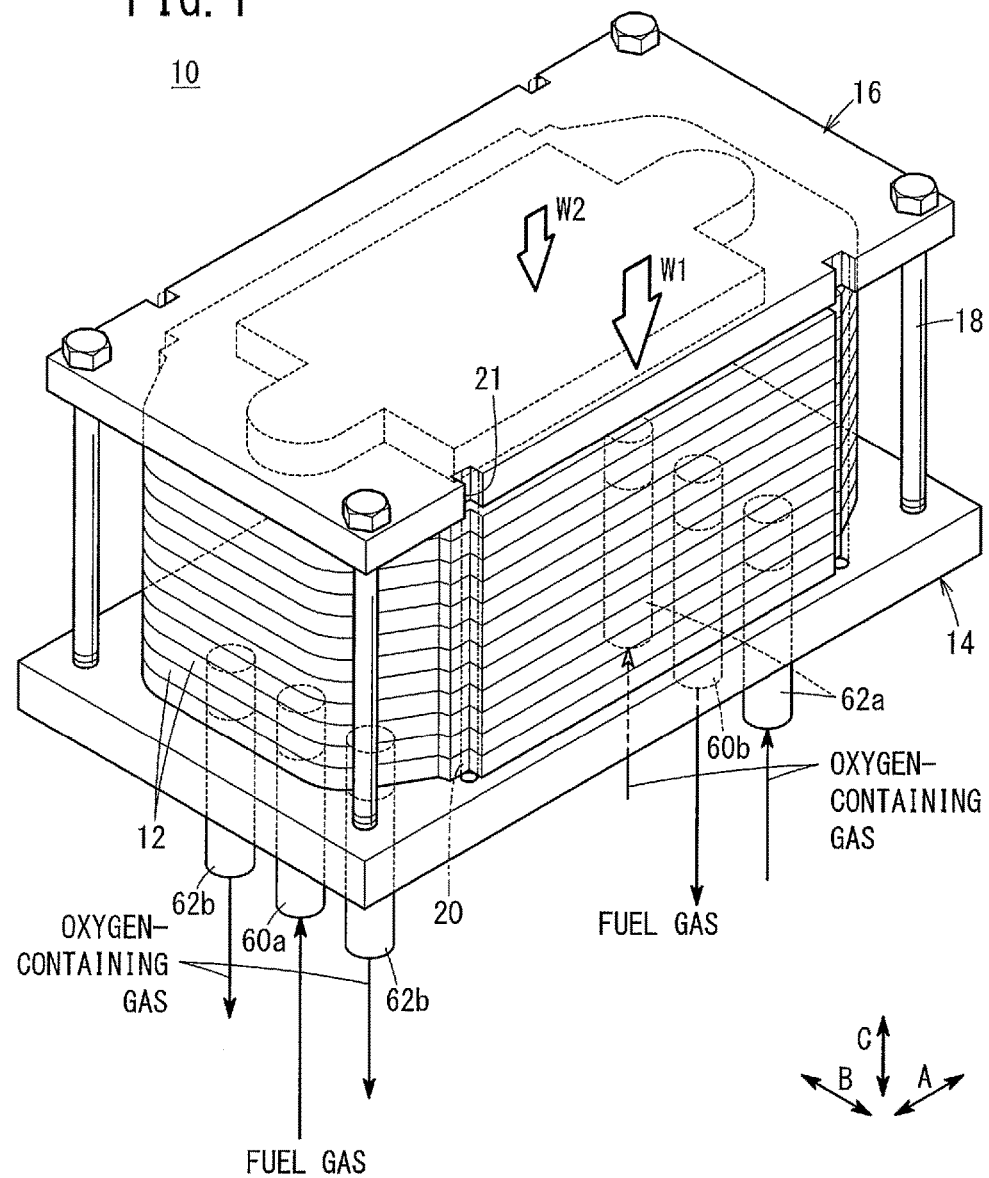
FIG. 1 is a perspective view schematically showing a fuel cell stack according to a first embodiment of the present invention.
Figure 2:
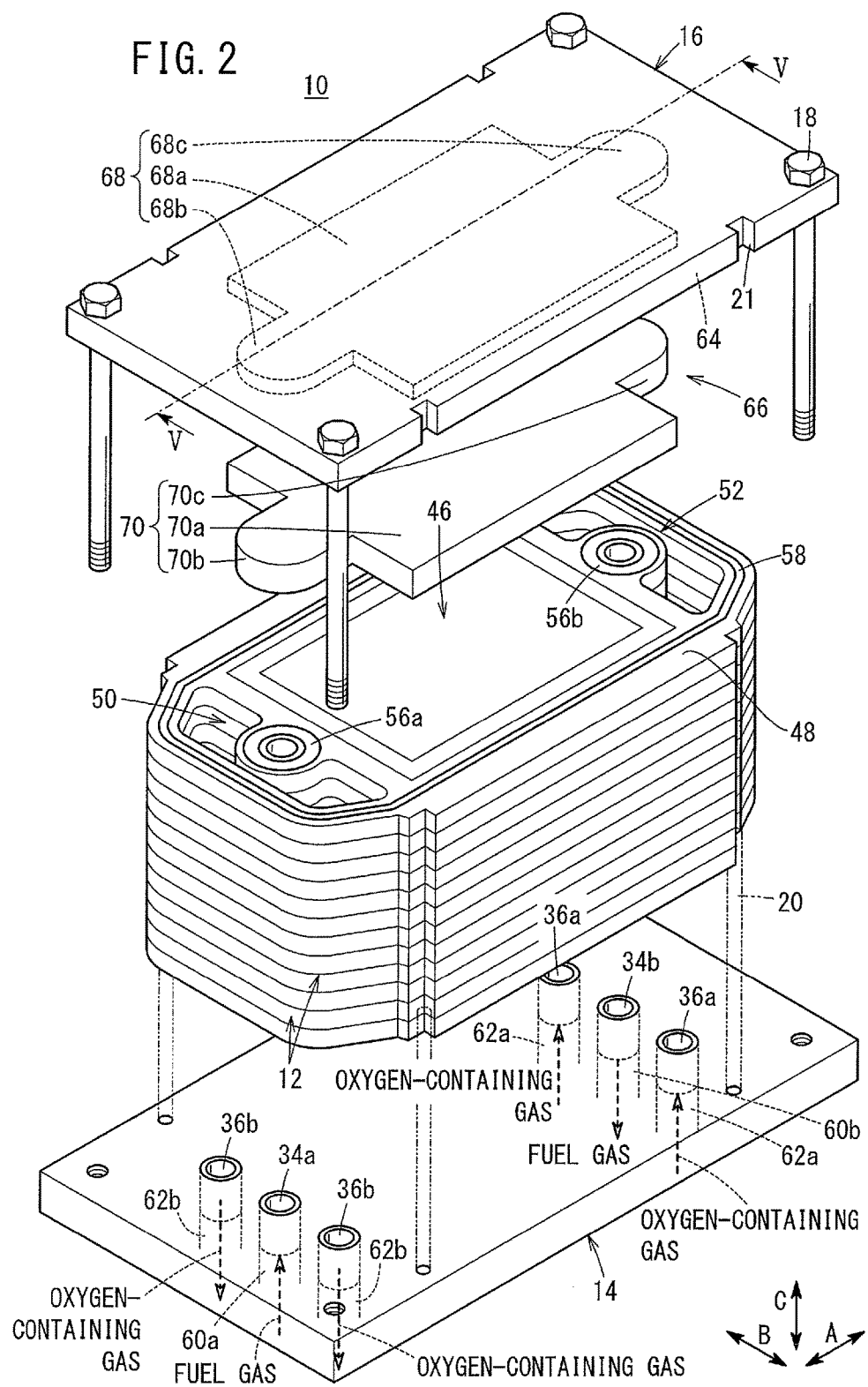
FIG. 2 is an exploded perspective view showing main components of the fuel cell stack.

As shown in FIGS. 1 and 2, a fuel cell stack 10 according to a first embodiment of the present invention is formed by stacking a plurality of solid oxide fuel cells 12 in a vertical direction indicated by an arrow C. The fuel cell stack 10 may be used in a stationary application. Additionally, the fuel cell stack 10 may be used in various applications. For example, the fuel cell stack 10 may be mounted in a vehicle.

The fuel cells 12 generate electricity by electrochemical reactions of a fuel gas (hydrogen-containing gas such as a mixed gas of a hydrogen gas and methane or a carbon monoxide) and an oxygen-containing gas (air). A base frame 14 is provided at one end of the fuel cells 12 in the stacking direction, and a roof frame 16 is provided at the other end of the fuel cells 12 in the stacking direction. The base frame 14 and the roof frame 16 are fixed using a plurality of tightening bolts 18. A plurality of guide pins 20 are provided at the base frame 14 for positioning the respective fuel cells 12. Cutouts (or holes) 21 are formed in the roof frame 16 for inserting the guide pins 20 into the cutouts 21, respectively. The guide pins 20 are removed after components of the fuel cell stack 10 are stacked together.

Figure 3:
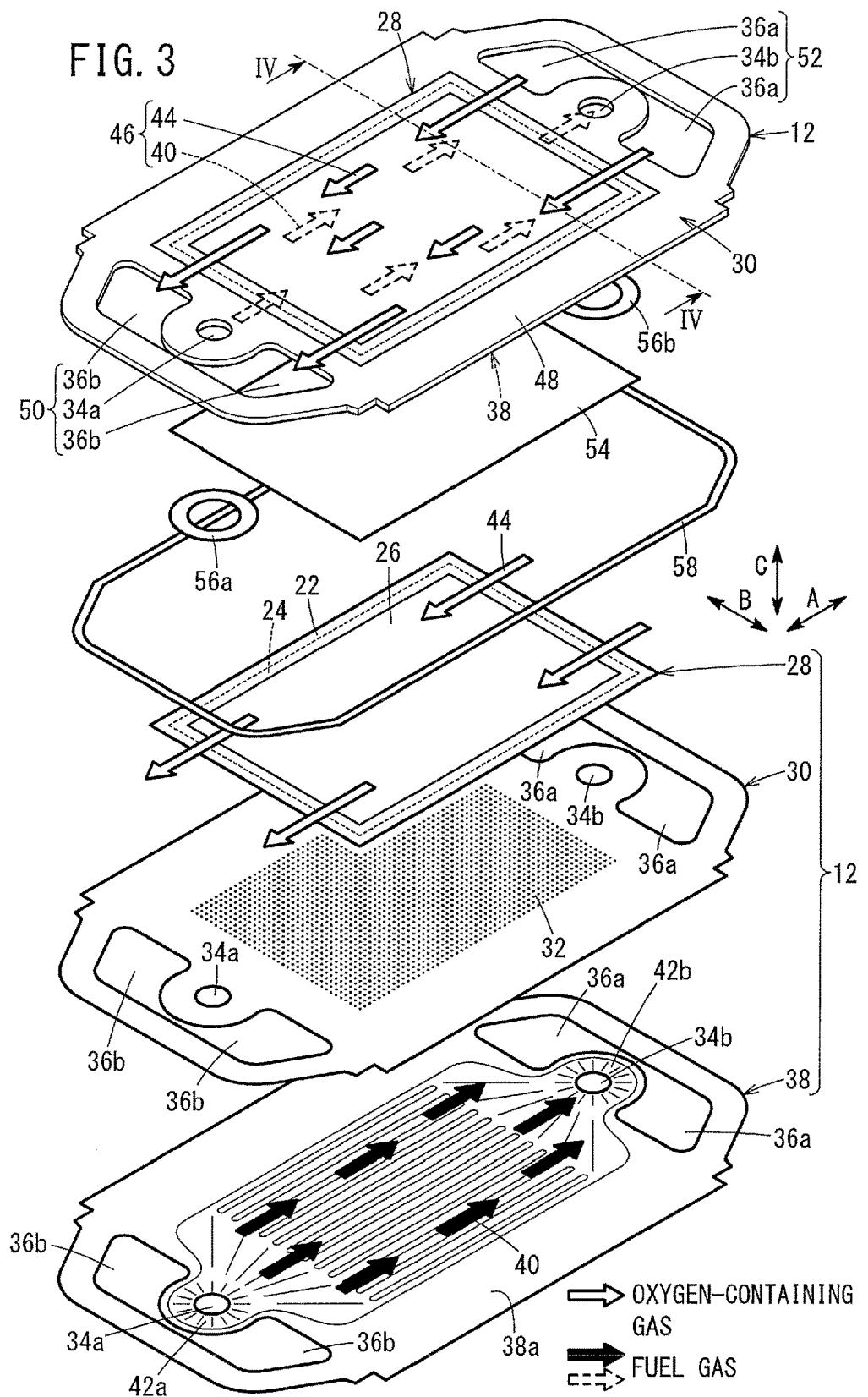
FIG. 3 is an exploded perspective view showing a fuel cell of the fuel cell stack.
Figure 4:
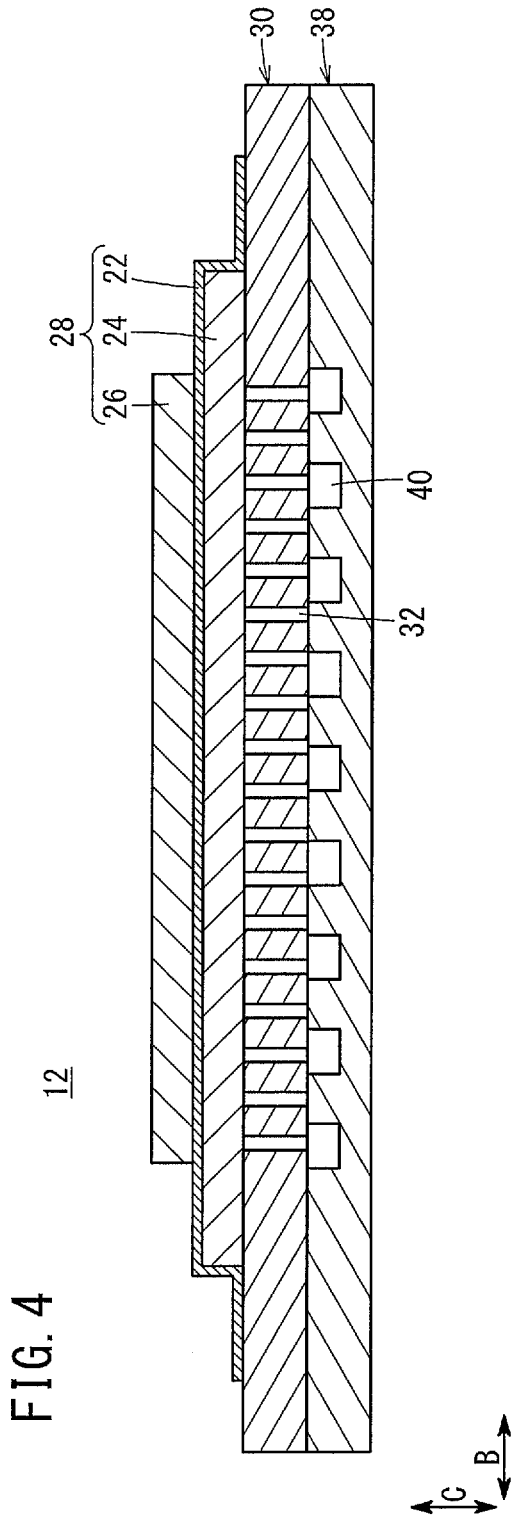
FIG. 4 is a cross sectional view showing the fuel cell, taken along a line IV-IV in FIG. 3.

As shown in FIGS. 3 and 4, the fuel cell 12 includes an electrolyte 22. The electrolyte 22 is an ion oxide conductor made of, e.g., stabilized zirconia, ceria based material, lanthanum gallate based material. An anode 24 is provided on one surface of the electrolyte 22, and a cathode 26 is provided on the other surface of the electrolyte 22 to form an electrolyte electrode assembly (MEA) 28. The surface size (outer size) of the cathode 26 is smaller than the surface size (outer size) of the anode 24, and the surface size (outer size) of the anode 24 is smaller than the surface size (outer size) of the electrolyte 22.

The electrolyte electrode assembly 28 is joined to a metal support body 30. For example, the metal support body 30 is a thin plate of stainless steel material (SUS), and a large number of anode flow holes 32 are formed in the power generation area (central part) of the metal support body 30 (see FIGS. 3 and 4). The anode flow holes 32 are formed, e.g., by etching or laser processing. Alternatively, a porous metal may be used for providing the anode flow holes 32.

As shown in FIG. 3, the metal support body 30 has a rectangular shape, and a fuel gas supply passage 34a is provided at one end of the metal support body 30 in a longitudinal direction indicated by an arrow A. Moreover, an oxygen-containing gas discharge passage 36b is provided at the one end of the metal support body 30 in the longitudinal direction, around the fuel gas supply passage 34a. The oxygen-containing gas discharge passage 36b is mainly opened on both sides of the fuel gas supply passage 34a in the direction indicated by the arrow B.

A fuel gas discharge passage 34b is provided at the other end of the metal support body 30 in the longitudinal direction. Moreover, an oxygen-containing gas supply passage 36a is provided at the other end of the metal support body 30 in the longitudinal direction, around the fuel gas discharge passage 34b. The oxygen-containing gas supply passage 36a is mainly opened on both sides of the fuel gas discharge passage 34b in the direction indicated by the arrow B.

A channel member 38 of a thin metal plate is fixed to a surface of the metal support body 30, opposite to the electrolyte electrode assembly 28, e.g., by welding. The channel member 38 and the metal support body 30 have substantially the same shape. At one end of the channel member 38 in the longitudinal direction, the fuel gas supply passage 34a and the oxygen-containing gas discharge passage 36b are formed. At the other end of the channel member 38 in the longitudinal direction, the fuel gas discharge passage 34b and the oxygen-containing gas supply passage 36a are formed.

A fuel gas channel 40 is formed on a surface 38a of the channel member 38 joined to the metal support body 30 for allowing the fuel gas to flow along the fuel gas channel 40 in the direction indicated by the arrow A. The fuel gas channel 40 includes a plurality of ridges and a plurality of channel grooves formed between these ridges. An inlet side of the fuel gas channel 40 and the fuel gas supply passage 34a are connected through an inlet connection channel 42a formed by a plurality of ridges around the fuel gas supply passage 34a. An outlet side of the fuel gas channel 40 and the fuel gas discharge passage 34b are connected through an outlet connection channel 42b formed by a plurality of ridges around the fuel gas discharge passage 34b.

The metal support body 30 has an oxygen-containing gas channel 44 on a side facing the electrolyte electrode assembly 28. The oxygen-containing gas channel 44 is connected between the oxygen-containing gas supply passage 36a and the oxygen-containing gas discharge passage 36b. The oxygen-containing gas channel 44 is formed between the cathode 26 and a cathode current collector 54 described later, specifically, inside the current collector 54 (internal space of porous material). The fuel gas in the fuel gas channel 40 and the oxygen-containing gas in the oxygen-containing gas channel 44 flow in opposite directions in a counterflow manner.

It should be noted that the fuel gas in the fuel gas channel 40 and the oxygen-containing gas in the oxygen-containing gas channel 44 may flow in the same direction in a parallel manner. In this case, the fuel gas supply passage 34a and the oxygen-containing gas supply passage 36a are positioned at the same end, and fuel gas discharge passage 34b and the oxygen-containing gas discharge passage 36b are positioned at the same end.

The fuel cell 12 includes a power generation reaction area 46 where the fuel gas channel 40 and the oxygen-containing gas channel 44 are formed separately on front and back sides, a frame shaped marginal area 48 formed around the power generation reaction area 46, and a first reactant gas flow area 50 and a second reactant gas flow area 52. The first reactant gas flow area 50 has the fuel gas supply passage 34a and the oxygen-containing gas discharge passage 36b, and the second reactant gas flow area 52 has the fuel gas discharge passage 34b and the oxygen-containing gas supply passage 36a.

The first reactant gas flow area 50 is formed outside of one end of the power generation reaction area 46 in the direction indicated by the arrow A and inside the marginal area 48. The second reaction gas flow area 52 is formed outside the other end of the power generation reaction area 46 in the direction indicated by the arrow A and inside the marginal area 48.

The cathode current collector 54 is stacked on the cathode 26. The cathode current collector 54 and the cathode 26 have substantially the same size, and the cathode current collector 54 is relatively thick. For example, the cathode current collector 54 is made of foamed meal of, e.g., nickel or made of metal mesh, etc.

A ring shaped seal member 56a is formed around the fuel gas supply passage 34a, and a ring shaped seal member 56b is formed around the fuel gas discharge passage 34b. The ring shaped seal members 56a, 56b have insulating capability and sealing capability. For example, each of the ring shaped seal members 56a, 56b is an incompressible seal member formed by applying glass paste to a ceramic plate.

A seal member 58 is formed on the marginal area 48. The seal member 58 has substantially the same size as this marginal area 48. The seal member 58 has insulating capability and sealing capability. For example, the seal member 58 is made of mica or Thermiculite (registered trademark). The seal member 58 seals the oxygen-containing gas supply passage 36a, the oxygen-containing gas discharge passage 36b, and the oxygen-containing gas channel 44 while allowing the oxygen-containing gas supply passage 36a and the oxygen-containing gas discharge passage 36b to be connected to the oxygen-containing gas channel 44.

As shown in FIGS. 1 and 2, a fuel gas supply pipe 60a connected to the fuel gas supply passage 34a, and a fuel gas discharge pipe 60b connected to the fuel gas discharge passage 34b extend from the base frame 14 to the outside. Further, a pair of oxygen-containing gas supply pipes 62a connected to the oxygen-containing gas supply passage 36a and a pair of oxygen-containing gas discharge pipes 62b connected to the oxygen-containing gas discharge passage 36b extend from the base frame 14 to the outside.

As shown in FIG. 2, the roof frame 16 includes a first load applying unit 64 for applying a first load W1 to the marginal area 48 in the stacking direction of the fuel cells 12, and a second load applying unit 66 for applying a second load W2 to the power generation reaction area 46 in the stacking direction. The first load W1 is larger than the second load W2 (W1>W2) (see FIG. 1).

The first load applying unit 64 comprises an outer marginal portion of a surface of the roof frame 16 facing the fuel cells 12. The second load applying unit 66 includes a recess 68 recessed from the first load applying unit 64 in a direction away from the fuel cells 12 (upward in the vertical direction in FIG. 2).

The recess 68 includes a rectangular portion 68a corresponding to the shape of the power generation reaction area 46 of the fuel cells 12. One end of the rectangular portion 68a is connected to a circular arc end 68b corresponding to the shape of the ring shaped seal member 56a provided at the fuel gas supply passage 34a. The other end of the rectangular portion 68a is connected to a circular arc end 68c corresponding to the shape of the ring shaped seal member 56b provided at the fuel gas discharge passage 34b.

A fiber mat (inorganic fiber mat) 70 at least containing alumina is provided in the recess 68. The fiber mat 70 is made of ceramic material such as alumina, zirconia, silica, silicon carbide, mullite, or vermiculite, or material derived from mineral. Insulating material having heat-resistant stability of 900° C. or more can be used for the fiber mat 70. In the first embodiment, among these materials, the fiber mat 70 chiefly containing alumina and silica is used. The alumina content of the fiber mat 70 is larger than the silica content of the fiber mat 70. Alternatively, the fiber mat 70 may only contain a single material of alumina.

The shape of the fiber mat 70 corresponds to the shape of the recess 68, and the fiber mat 70 includes a rectangular mat portion 70a inserted into the rectangular portion 68a and circular arc mat portions 70b, 70c inserted into the circular arc ends 68b, 68c. The thickness of the fiber mat 70 is larger than the depth of the recess 68 when a tightening load is applied to the fuel cell stack 10 (see FIG. 5).

Though not shown, terminal plates and insulating plates are stacked between both ends of the fuel cells 12 in the stacking direction and the base frame 14 and the roof frame 16.

Operation of the fuel cell stack 10 will be described below.

As shown in FIGS. 1 and 2, the fuel gas supply pipe 60a and the pair of oxygen-containing gas supply pipes 62a are connected to the base frame 14 of the fuel cell stack 10. In the structure, a fuel gas (e.g., hydrogen gas) is supplied to the fuel gas supply pipe 60a, and an oxygen-containing gas such as air is supplied to the pair of oxygen-containing gas supply pipes 62a.

Figure 5:
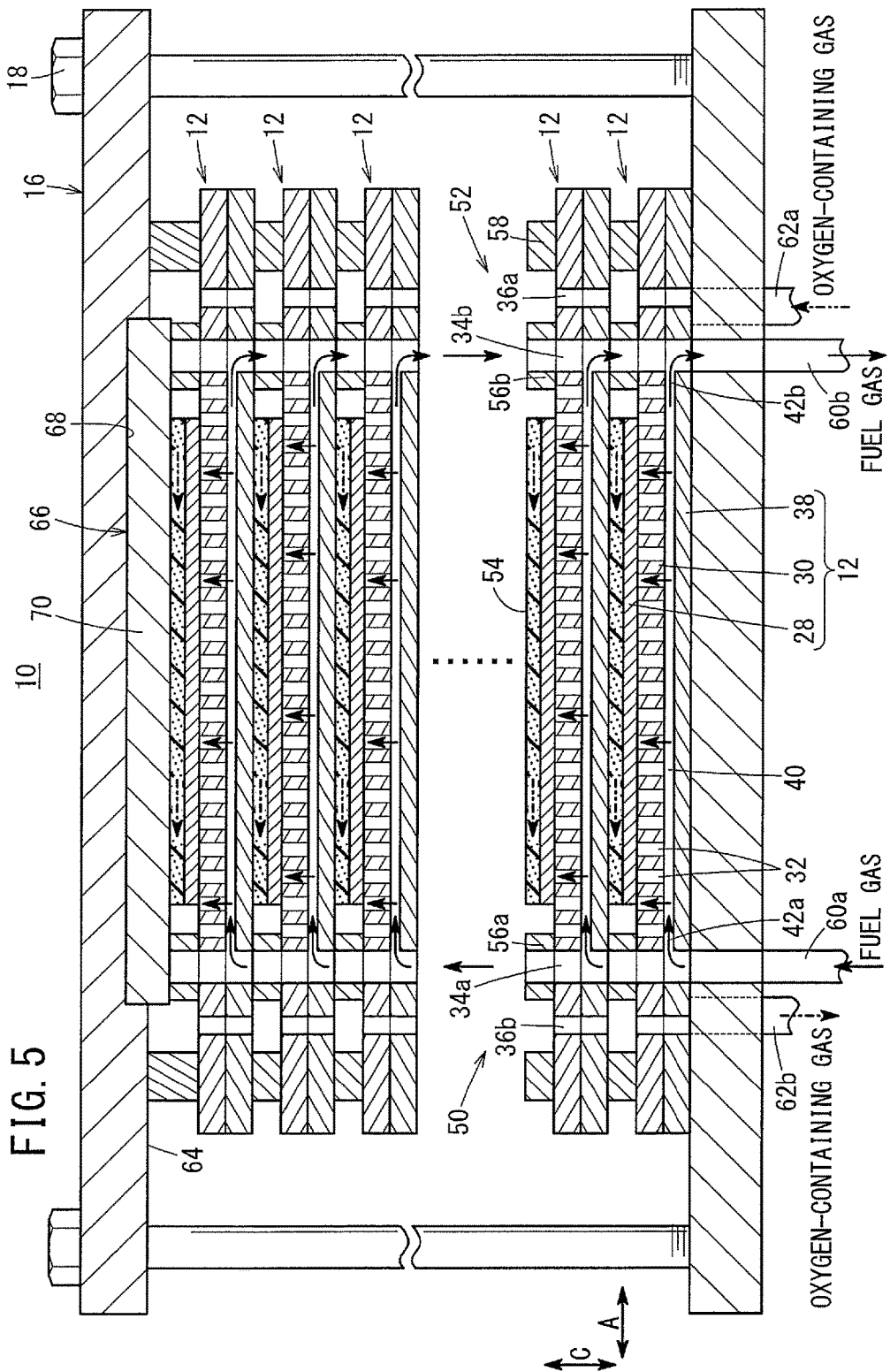
FIG. 5 is a cross sectional view showing the fuel cell, taken along a line V-V in FIG. 2.

As shown in FIGS. 3 and 5, the fuel gas from the fuel gas supply pipe 60a flows along the fuel gas supply passage 34a upward in the vertical direction. In each of the fuel cells 12, an inlet connection channel 42a is formed between the metal support body 30 and the channel member 38, and the fuel gas is supplied from the inlet connection channel 42a to each fuel gas channel 40.

Therefore, the fuel gas flows along the fuel gas channel 40 in the direction indicated by the arrow A, and flows through the anode flow hole 32 of the metal support body 30, and the fuel gas is supplied to the anode 24 of the electrolyte electrode assembly 28. The fuel gas moved along the fuel gas channel 40 to the outlet connection channel 42b is discharged into the fuel gas discharge passage 34b, and the fuel gas moves downward in the vertical direction to the fuel gas discharge pipe 60b.

The air from the pair of oxygen-containing gas supply pipes 62a moves along the oxygen-containing gas supply passage 36a upward in the vertical direction. In each fuel cell 12, the oxygen-containing gas channel 44 is formed, and the air is supplied from the oxygen-containing gas supply passage 36a to each oxygen-containing gas channel 44.

Therefore, the air moves along the oxygen-containing gas channel 44 in the direction indicated by the arrow A (the air and the fuel gas flow in the counterflow manner), and the air is supplied to the cathode 26 of the electrolyte electrode assembly 28. The air moved along the oxygen-containing gas channel 44 is discharged into the pair of oxygen-containing gas discharge passages 36b. Then, the air moves downward in the vertical direction, and the air is discharged into the pair of oxygen-containing gas discharge pipes 62b.

Thus, in the electrolyte electrode assembly 28, the fuel gas is supplied to the anode 24 and air is supplied to the cathode 26. Therefore, oxide ions flow through the electrolyte 22 toward the anode 24 to perform power generation by chemical reactions.

In the first embodiment, as shown in FIG. 2, the roof frame 16 includes the first load applying unit 64 for applying the first load W1 to the marginal area 48 of the fuel cells 12 in the stacking direction. Further, the roof frame 16 includes the second load applying unit 66 for applying the second load W2 to the power generation reaction area 46 in the stacking direction.

In the structure, it becomes possible to apply the first load W1 to the marginal area 48 to suppress leakage of the reactant gases (fuel gas and oxygen-containing gas) as much as possible, and improve the gas sealing performance. Moreover, it becomes possible to apply the second load W2 to the power generation reaction area 46 to connect the current collection areas together further tightly, improve the current collection performance. Accordingly, it is possible to maintain the desired gas sealing performance and current collection performance while suppressing damages of the fuel cells 12 as much as possible.

Further, it becomes possible to effectively suppress leakage of the reactant gas flowing through the first reactant gas flow area 50 and the second reactant gas flow area 52 to the outside of the marginal area 48. Moreover, supply of the reactant gases to the power generation reaction area 46 and discharge of the reactant gases from the power generation reaction area 46 are facilitated. Accordingly, both of good gas sealing performance and good current collection performance are achieved further suitably.

Further, as shown in FIG. 3, in the first reactant gas flow area 50, the oxygen-containing gas discharge passage 36b is provided around the fuel gas supply passage 34a. In the second reactant gas flow area 52, the oxygen-containing gas supply passage 36a is provided around the fuel gas discharge passage 34b.

In the structure, in the first reactant gas flow area 50, by the oxygen-containing gas discharged from the power generation reaction area 46, it is possible to raise the temperature of the fuel gas supplied to the power generation reaction area 46. Accordingly, improvement in the heat efficiency is achieved, and thermally self-sustaining operation is facilitated easily. Thermally self-sustaining operation herein means operation where the entire amount of heat quantity required for operating the fuel cell stack 10 is supplied within the fuel cell stack 10, and where the operating temperature of the fuel cell stack 10 is maintained using only heat energy generated in the fuel cell stack 10, without supplying additional heat from the outside.

In the second reactant gas flow area 52, by the fuel gas discharged from the power generation reaction area 46, it is possible to raise the temperature of the oxygen-containing gas supplied to the power generation reaction area 46. Accordingly, improvement in the heat efficiency is achieved, and thermally self-sustaining operation is facilitated easily.

Further, the fuel cell stack 10 includes the base frame 14 provided at one end in the stacking direction, and the roof frame 16 provided at the other end in the stacking direction for applying the load in the stacking direction. In this regard, as shown in FIGS. 2 and 5, the roof frame 16 includes the first load applying unit 64 and the second load applying unit 66. The fiber mat 70 at least containing alumina is provided in the recess 68 of the second load applying unit 66.

Therefore, the roof frame 16 applies the second load W2 indirectly to the stacked fuel cells 12 through the fiber mat 70. Thus, even if heat stress is generated within the fuel cell stack 10, it becomes possible to absorb the heat stress by the elasticity of the fiber mat 70.

Further, the first load W1 is larger than the second load W2 (see FIG. 1). Therefore, it becomes possible to apply the first load W1 to the marginal area 48 to suppress leakage of the reactant gases as much as possible, and improve the gas sealing performance. Further, it becomes possible to apply the second load W2 to the power generation reaction area 46 to connect the current collection areas together further tightly and improve the current collection performance. Accordingly, it is possible to maintain the desired gas sealing performance and current collection performance while suppressing damages of the fuel cells 12 as much as possible.

Further, as shown in FIGS. 3 and 4, the fuel cell 12 is a metal support type fuel cell where the electrolyte electrode assembly 28 is joined to the metal support body 30. Thus, reduction in the thickness of the fuel cell 12 itself is achieved as much as possible, and reduction in the overall size of the fuel cell stack 10 is achieved easily. Further, since the fuel cell 12 has the metal support body 30, heat conductivity is relatively good, and it becomes possible to absorb the heat stress by the fuel cell 12 itself.

Further, the fuel cell 12 is a solid oxide fuel cell. Therefore, the fuel cell 12 is optimally applicable to high temperature type fuel cells such as SOFC.

Figure 6:
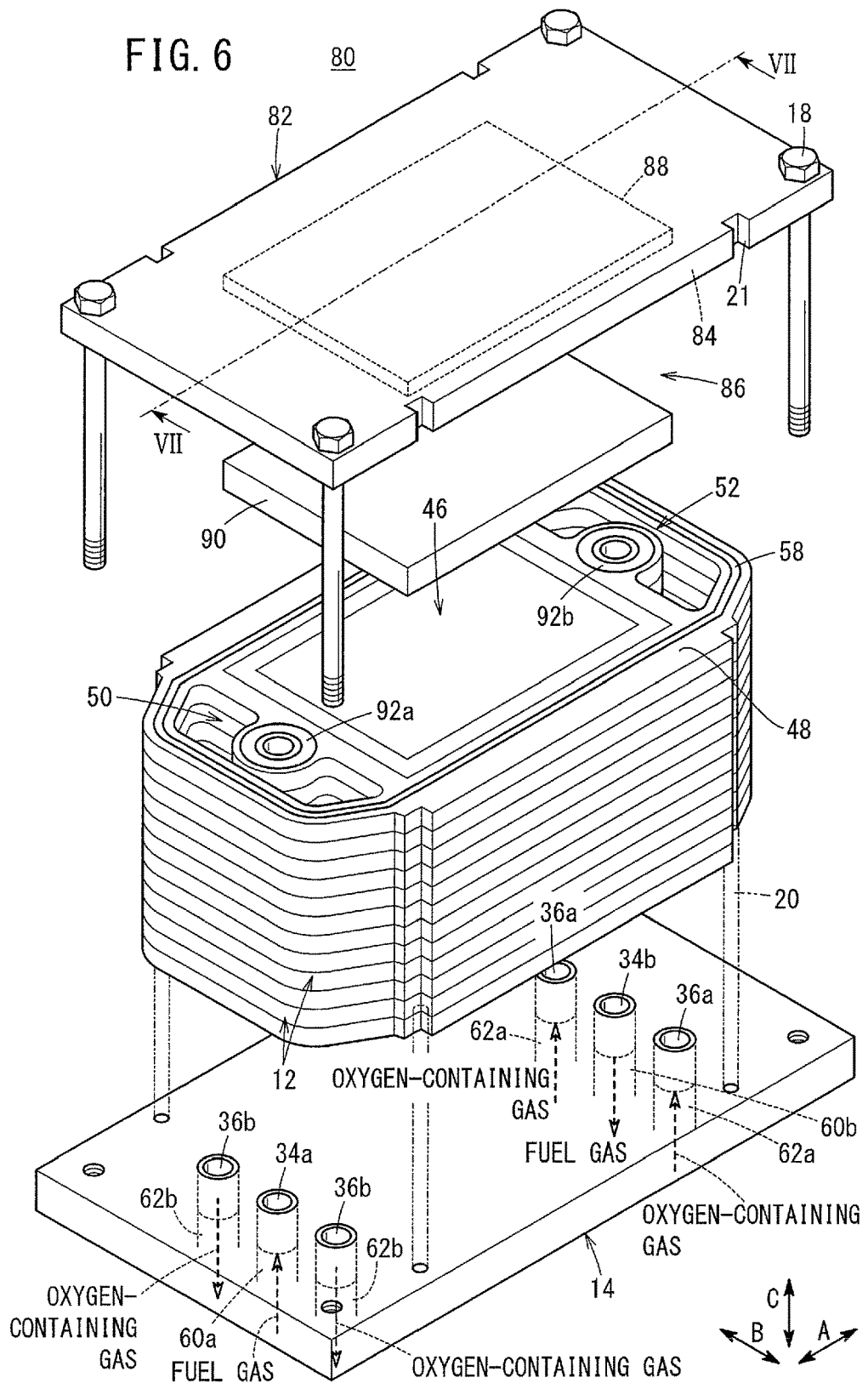
FIG. 6 is an exploded perspective view showing main components of a fuel cell stack according to a second embodiment of the present invention.
Figure 7:
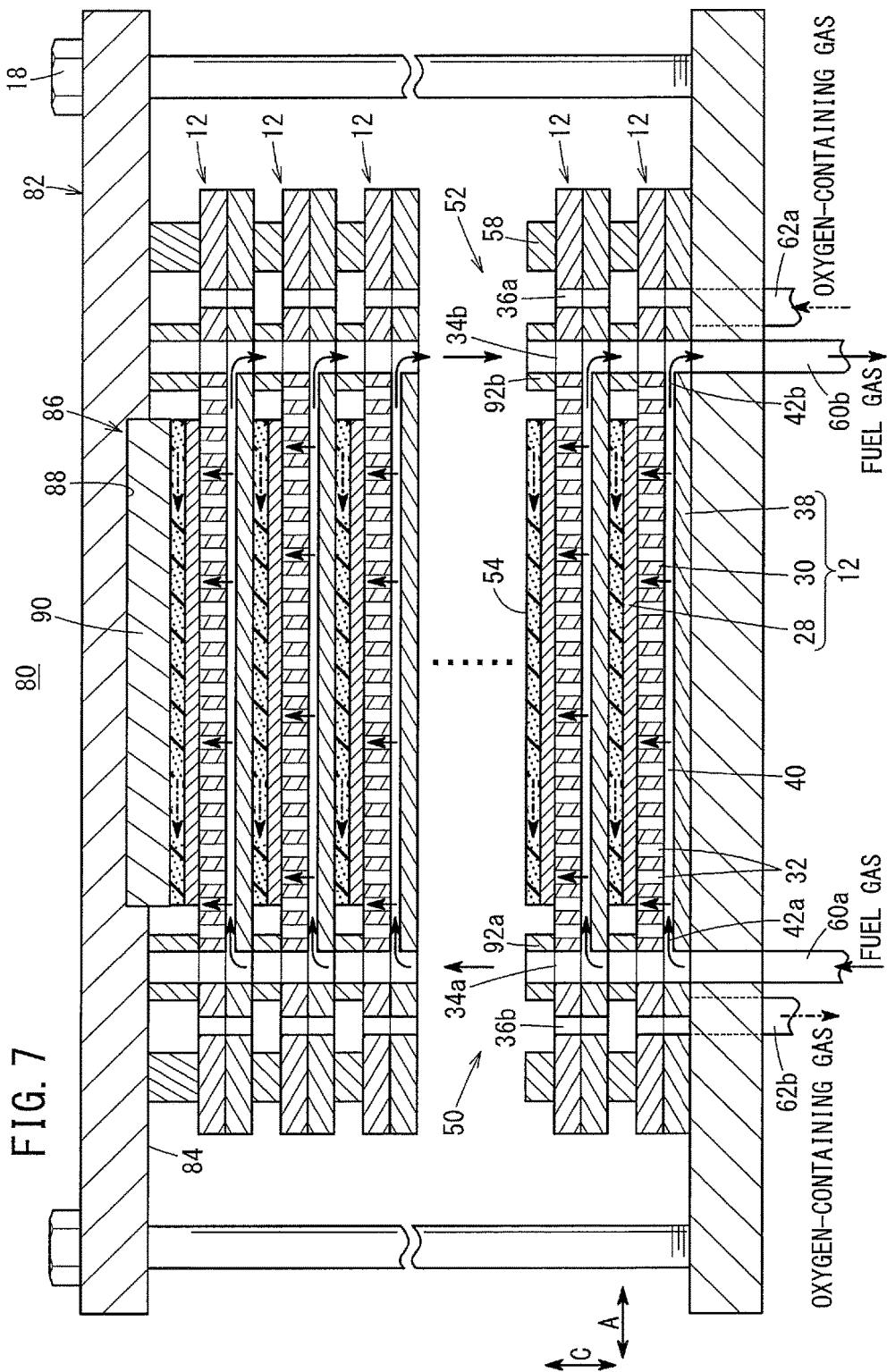
FIG. 7 is a cross sectional view showing the fuel cell stack, taken along a line VII-VII in FIG. 6.
Figure 8:
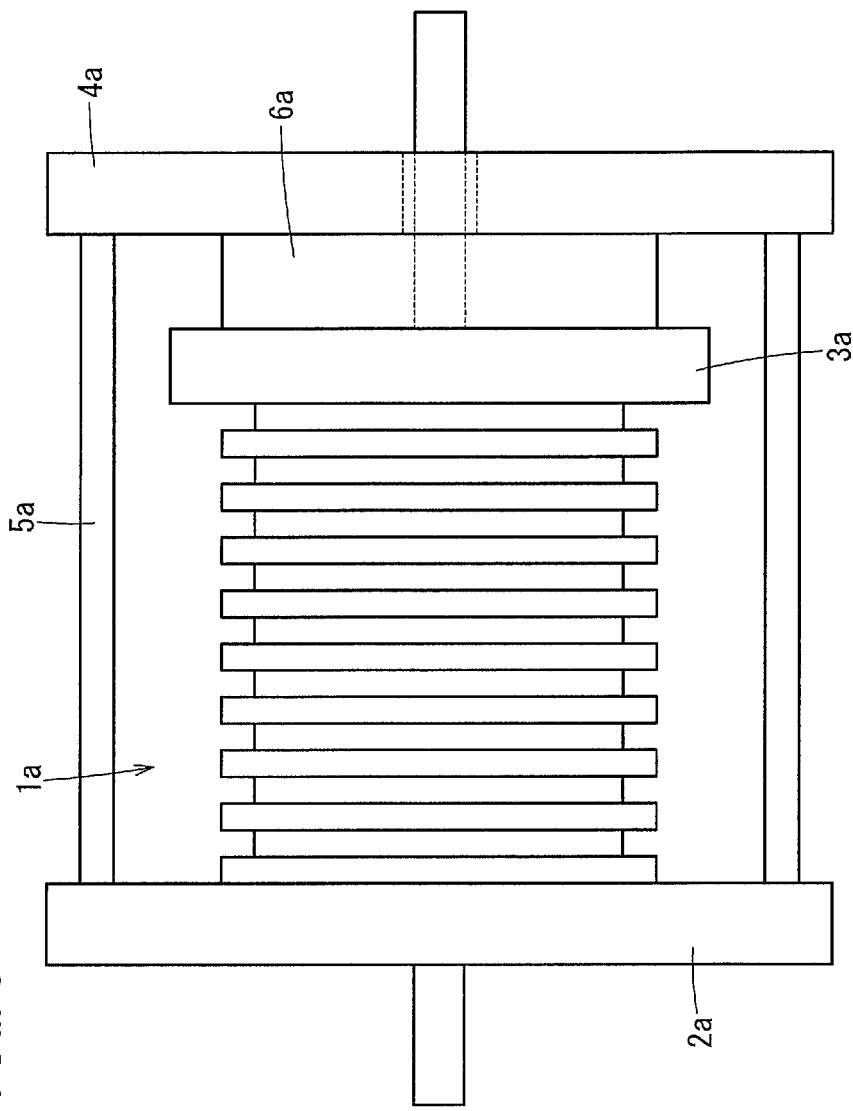
FIG. 8 is a view showing an electrochemical cell stack of a conventional technique 1.
Figure 9:
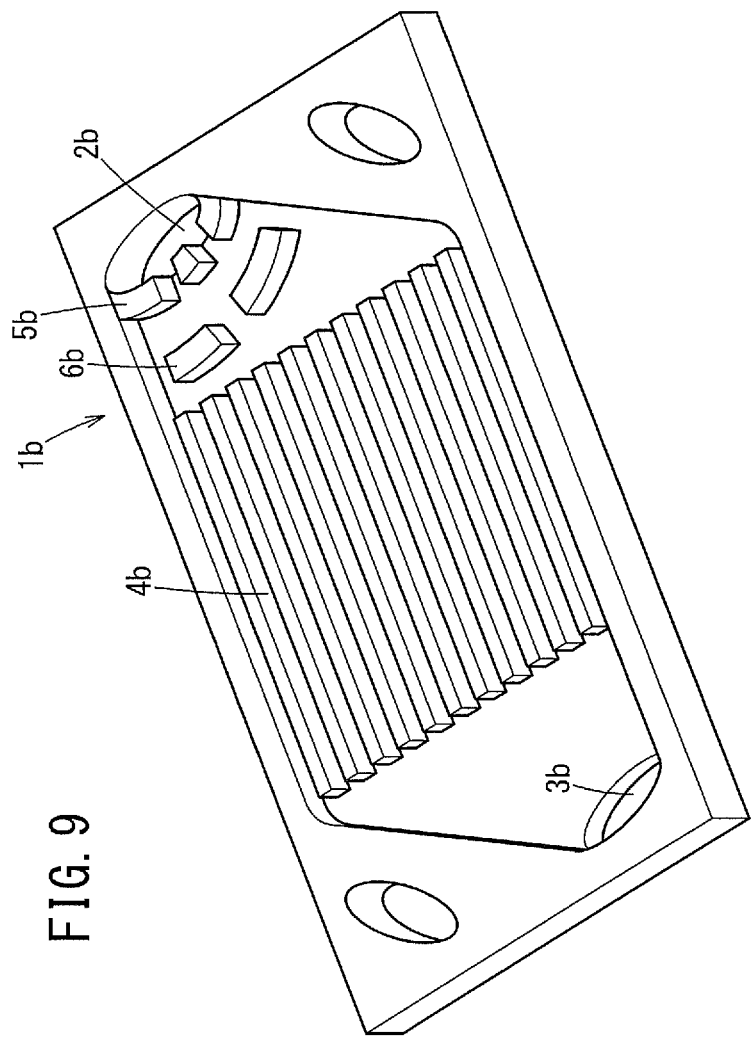
FIG. 9 is a perspective view showing a separator of a fuel cell of a conventional technique 2.

FIG. 6 is an exploded perspective view showing main components of a fuel cell stack 80 according to a second embodiment of the present invention. The constituent elements that are identical to those of the fuel cell stack 10 according to the first embodiment are labeled with the same reference numerals and description thereof will be omitted.

The fuel cell stack 80 includes a roof frame 82 instead of the roof frame 16. The rood frame 82 includes a first load applying unit 84 for applying a first load W1 to the marginal area 48 in the stacking direction of the fuel cells 12 and a second load applying unit 86 for applying a second load W2 to the power generation reaction area 46 in the stacking direction.

The first load applying unit 84 comprises an outer marginal area of a surface of the roof frame 82 facing the fuel cells 12. The second load applying unit 86 includes a recess 88 recessed from the first load applying unit 84 in a direction away from the fuel cells 12. The recess 88 has a rectangular shape corresponding to the shape of the power generation reaction area 46 of the fuel cells 12.

A fiber mat (inorganic fiber mat) 90 at least containing alumina is provided in the recess 88. The fiber mat 90 is made of the same material as that of the fiber mat 70. The fiber mat 90 has a rectangular shape corresponding to the shape of the recess 88.

The fuel cell stack 80 includes ring shaped seal members 92a, 92b instead of the ring shaped seal members 56a, 56b. The ring shaped seal members 92a, 92b have insulating capability and sealing capability. For example, each of the ring shaped seal members 92a, 92b is a compressible seal member using mica or Thermiculite (registered trademark).

As described above, in the second embodiment, the ring shaped seal members 92a, 92b are compressive seal members. Therefore, the fiber mat 90 is not required to have a shape to cover the fuel gas supply passage 34a and the fuel gas discharge passage 34b. It is because the ring shaped seal members 92a, 92b themselves are deformable.

Accordingly, in the second embodiment, the same advantages as in the case of the first embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack formed by stacking a plurality of fuel cells, the fuel cells each having an electrolyte electrode assembly including an anode, a cathode, and an electrolyte interposed between the anode and the cathode, the fuel cells each comprising:

a power generation reaction area having a fuel gas channel configured to supply a fuel gas along an electrode surface of the anode and an oxygen-containing gas channel configured to supply an oxygen-containing gas along an electrode surface of the cathode, the fuel gas channel and the oxygen-containing gas channel being formed separately on front and back sides of the power generation reaction area;

a frame shaped marginal area provided around the power generation reaction area; and a first reactant gas flow area and a second reactant gas flow area, each of which has a fuel gas passage and an oxygen-containing gas passage, the fuel gas passage configured to allow the fuel gas to flow in a stacking direction of the fuel cells and connected to the fuel gas channel, and the oxygen-containing gas passage configured to allow the oxygen-containing gas to flow in the stacking direction and connected to the oxygen-containing gas channel, wherein the first reactant gas flow area is provided outside one end of the power generation reaction area and inside the marginal area, and the second reactant gas flow area is provided outside another end of the power generation reaction area and inside the marginal area;

the first reactant gas flow area has one of a fuel gas supply passage and a fuel gas discharge passage as the fuel gas passage and one of an oxygen-containing gas supply passage and an oxygen-containing gas discharge passage as the oxygen-containing gas passage;

the second reactant gas flow area has one of the fuel gas supply passage and the fuel gas discharge passage different than the one of the fuel gas supply passage and the fuel gas discharge passage which the first reactant gas flow area has as the fuel gas passage, and one of the oxygen-containing gas supply passage and the oxygen-containing gas discharge passage different than the one of the oxygen-containing gas supply passage and the oxygen-containing gas discharge passage which the first reactant gas flow area has as the oxygen-containing gas passage;

the fuel cell stack has a first load applying unit configured to apply a first load to the marginal area in the stacking direction and a second load applying unit configured to apply a second load to the power generation reaction area in the stacking direction;

in each of the first reactant gas flow area and the second reactant gas flow area of each of the fuel cells, when the fuel cells are viewed in the stacking direction, the oxygen-containing gas passage partially surrounds the fuel gas passage in the marginal area, in the first reactant gas flow area and the second reactant gas flow area, the oxygen-containing gas passage overlaps with the fuel gas passage in a longitudinal direction parallel to a direction extending between the one end of the power generation reaction area and the other end of the power generation reaction area, with the oxygen-containing gas passage provided on both sides of the fuel gas passage in a width direction perpendicular to the longitudinal direction and the stacking direction, and in the first reactant gas flow area and the second reactant gas flow area, the fuel gas passage is defined through a peninsular portion of the marginal area of the respective first reactant gas flow area and second reactant gas flow area, the peninsular portion extending into the oxygen-containing gas passage and being surrounded by a concave shaped opening portion of the oxygen-containing gas passage.

2. The fuel cell stack according to claim 1, wherein in the first reactant gas flow area, the oxygen-containing gas discharge passage partially surrounds the fuel gas supply passage; and in the second reactant gas flow area, the oxygen-containing gas supply passage partially surrounds the fuel gas discharge passage.

3. The fuel cell stack according to claim 1, further comprising a base frame provided at one end of the fuel cell stack in the stacking direction; and
- a roof frame provided at another end of the fuel cell stack in the stacking direction, and configured to apply a load in the stacking direction,
- wherein the roof frame has the first load applying unit and the second load applying unit;
- the second load applying unit has a recess recessed from the first load applying unit in a direction away from the fuel cells; and
- an inorganic fiber containing at least alumina is provided in the recess.

4. The fuel cell stack according to claim 3, wherein a first load applied by the first load applying unit is larger than a second load applied by the second load applying unit.

5. The fuel cell stack according to claim 1, wherein the fuel cell is a metal support type fuel cell where the electrolyte electrode assembly is joined to a metal support body.

6. The fuel cell stack according to claim 1, wherein the fuel cell is a solid oxide fuel cell.

\* \* \* \* \*